July 3, 1956  E. LIST  2,753,176
ELASTIC SUSPENSION DEVICE
Filed Nov. 1, 1952
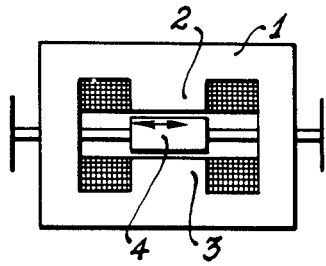
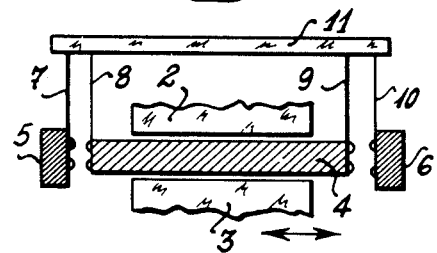
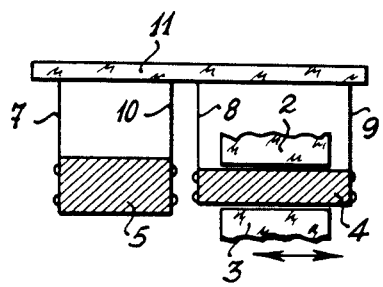
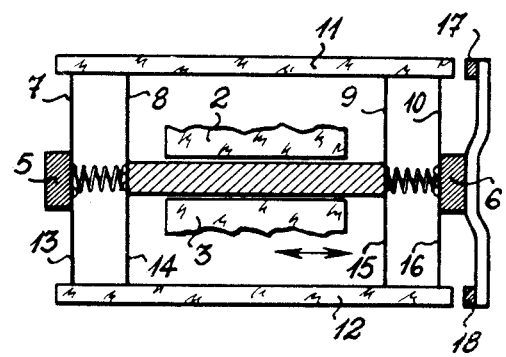
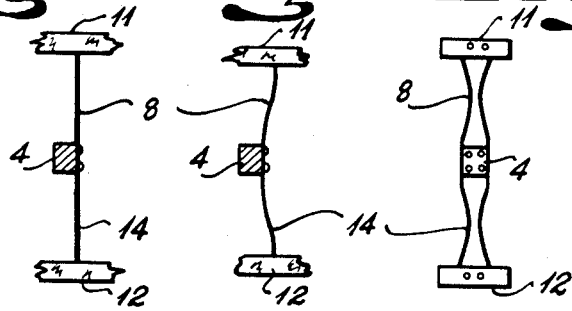
INVENTOR.
ENRIQUE LIST
BY United States Patent Office 2,753,176
Patented July 3, 1956

2,753,176

ELASTIC SUSPENSION DEVICE

Enrique List, Buenos Aires, Argentina, assignor to I. T. E. M., S. R. L., Buenos Aires, Argentina, a limited liability company Application November 1, 1952, Serial No. 318,286

9 Claims. (Cl. 267—1)

The present invention relates to the elastic suspension of oscillating parts, particularly in oscillating electromagnetically and electrodynamically-operated motors, and its main object consists in providing an improved elastic suspension device capable of ensuring a parallel motion of the oscillating parts and of acting at the same time as an energy-storing spring.

The oscillating electromagnetic or electrodynamic motors referred to, in general consist of a stator and an armature movably arranged between the pole pieces of the stator in such a manner that it is caused to effect a reciprocating motion.

In this class of motors it is of vital importance to ensure that the armature reciprocates in an absolutely straight or at least practically straight direction with respect to the stator without the armature being able to move in a direction transverse to that of its proper working motion.

The main object of the present invention is to provide an improved suspension device wherein an oscillating body is connected to at least two parallel leaf springs distant from each other and extending transversely to the direction of motion of the oscillating body, the leaf springs being further connected to a movable bar member which in turn, by means of leaf springs, is suspended from fixed or stationary bodies situated on or near the axis of motion of the oscillating body. This suspension device ensures a reciprocating motion of the oscillating body in a straight or practically straight direction.

A further advantage of the device of the present invention lies in the fact that the deflection of the individual leaf springs in one or the opposite direction is only one half of the stroke of the said oscillating body.

Another important object of the invention is to provide an improved elastic suspension device, wherein a double number of leaf springs and bar members are symmetrically arranged opposite each other. In this arrangement as applied to an oscillating electromagnetic motor the leaf springs, due to the reciprocating motion of the armature, are bent in an absolutely symmetrical manner with the advantageous result that both output and operation of an oscillating electromagnetic motor are improved.

A characteristic feature of the invention consists in providing bar members of a relatively light, but torsion-proof construction, for instance, of a U-shaped cross section.

It has been found that the desired oscillation of the bar members is occasionally superposed by an oscillation of a higher frequency or that the form of oscillation of the bar members is not entirely sinusoidal. In order to avoid a larger stroke of the bar members and to limit the same to a desired value, according to my invention I provide shock absorbers secured to a stationary bar and so arranged that they limit the stroke of the bar members. The shock absorbers may be of rubber or any other suitable resilient material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1 is a schematic view of an oscillating electromagnetic motor of the class of a shell type transformer;

Figure 2 schematically shows a first embodiment of the elastic suspension device according to the invention as applied to said motor;

Figure 3 shows a slightly modified arrangement of the elastic suspension device of Figure 2;

Figure 4 schematically illustrates another embodiment of the elastic suspension device according to the invention;

Figures 5, 6, and 7 show a leaf spring as used in the elastic suspension device in two side views in its stretched and bent condition and in a front view, respectively.

Referring to the accompanying drawing, Figure 1 schematically shows an oscillating electromagnetic motor in the form of a shell type transformer comprising a stator 1, the center portion being cut so as to form the poles 2 and 3 and a free space between these poles is provided for the armature 4 which reciprocates in the direction indicated by the arrow. For perfect operation of this oscillating electromagnetic motor it is absolutely necessary that the gaps between the armature 4 and the poles 2 and 3 remain unaltered.

The construction of the oscillating electromagnetic motor in the form of a shell type transformer has been shown by way of example only; it is understood that the stator of the oscillating motor may also be of any other construction, but the problem is always the same, viz. to maintain perfectly constant the gap or gaps between the stator and the armature.

Figure 2 illustrates an emodiment of the invention wherein the reference numeral 4 refers to the oscillating part or armature which is to be reciprocated in the direction of the arrow between the pole pieces 2 and 3. The reference numerals 5 and 6 denote a pair of stationary parts associated, for instance, with a mass larger than that of the armature 4. This armature is elastically and oscillatorily suspended by leaf springs 8 and 9 which are secured to a movable bar member 11, and this bar member 11 in turn is elastically and oscillatorily suspended through leaf springs 7 and 10 by the stationary parts 5 and 6.

When the oscillating part of armature 4 reciprocates in the direction indicated by the arrow, the leaf springs 7–10 will be bent so as to assume the form of an S-shaped curve. By virtue of the suspension of the oscillating part by means of the two leaf springs 8 and 9, the oscillating part is compelled to reciprocate in straight horizontal direction without any possibility of a displacement of its axis of motion.

A characteristic feature of the invention lies in the fact that the bar member 11, without changing its position parallel to the axis of motion of the oscillating part 4, is able to move in a direction perpendicular to said axis of motion with the result that it may follow the movements of the leaf springs when being bent.

Figure 3 shows an embodiment of the invention, wherein the leaf springs connected to the stationary mass are arranged on one side of the leaf springs connected to the oscillating mass.

In this Figure 3, the reference numeral 5 indicates the stationary mass which, by means of the leaf springs 7 and 10 supports the bar member 11, whereas the oscillating mass or armature to be reciprocated between the pole pieces 2 and 3 has been indicated as at 4 and is connected by means of the leaf springs 8 and 9 to the bar member 11.

The operation of the device according to this embodyment of the invention is exactly the same as that previously described with reference to Figure 2. In this case, too, the leaf springs when being bent assume the form of an S-shaped curve, while the mass or armature 4 reciprocates in a straight line as indicated by the arrow.

Finally, Figure 4 illustrates an embodiment of my invention, wherein two arrangements of the type shown in Figure 2 are used and disposed opposite each other.

In Figure 4, the oscillating part or armature 4 reciprocates between the pole pieces 2 and 3. The bodies 5 and 6 constitute the stationary mass of the system. The leaf springs 7 and 10 connect the stationary bodies 5 and 6 to the movable bar member 11, whereas the leaf springs 8 and 9 connect said bar member 11 to the oscillating part or armature 4. This oscillating part or armature 4 is further connected by means of like leaf springs 14 and 15 to a second bar member 12 which in turn is connected by the leaf springs 13 and 16 to the stationary bodies 5 and 6.

In the embodiment according to Figure 4, the respectively oppositely disposed leaf springs 7, 13—8, 14—9, 15—10, 16 may be integrally connected and thus consist respectively of single steel bands.

When the oscillating part or armature 4 reciprocates in the direction indicated by the arrow, all of the leaf springs are bent in such a manner that each spring portion 9—10, 13—16 assumes the form of an S-shaped curve, while the bar members 11, 12 effect reciprocating movements in a direction parallel to the axis of motion of the oscillating part 4, but with one half of the amplitude of the reciprocating movements of the latter, and in addition thereto the bar members are slightly displaced in a direction perpendicular to the axis of motion of the oscillating part 4.

The reference numerals 17 and 18 refer to a pair of shock absorbers of rubber or any other suitable material fixed, for instance, on the body 6, for the purpose of limiting the motion of the bar members 11, 12 without, however, preventing the latter from executing their normal reciprocating movements.

Figures 5–7 show the construction of one of the leaf springs e. g. 8, 14 used in the embodiment of Figure 4. In Figure 5 this leaf spring 8, 14 is shown in its stretched condition and in Figure 6 in its bent condition in which the two spring portions 8 and 14 assume the form of an S-shaped curve. Figure 7 is a front view of the leaf spring 8, 14 and shows that each spring portion 8 and 14, has a center portion of reduced breadth. This construction of the spring is advantageous insofar as it has at any cross section the same flexure strength, and by virtue thereof, the load supported by the spring may be three times the load supported by a rectangular leaf spring.

In order to obtain the stiffness of the springs required for the operation of an oscillating electromagnetic motor it is possible to arrange a number of individual leaf springs, one closely behind the other. Another method of increasing the stiffness of the elastic suspension consists of combining the leaf springs with helical springs which in the embodiment shown in Figure 4 may be arranged, for instance, between the stationary bodies 5, 6 and the adjacent ends of the oscillating part 4.

In oscillating machines comprising the combination of an oscillating electromagnetic or electrodynamic motor with a working device, as for instance, a pump, the armature of the motor and the movable part of the working device, the piston of the pump, will be interconnected so as to form a rigid unit, whereas on the other hand, the stator of the motor and the casing of the pump forming the stationary masses will also be combined with one another, so that the leaf springs of the elastic suspension device may be connected as described above to the oscillating and stationary parts, respectively.

It will be understood that each of the elements described above, or two or more together, may also find a useful application in other types of suspension devices differing from the types described above.

While the invention has been illustrated and described as embodied in elastic suspension device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Elastic suspension device for an oscillating body comprising a first pair of leaf springs having their lower end portions rigidly secured to said oscillating body and their upper end portions to a rigid but light bar member for oscillatorily suspending said oscillating body, a pair of stationary bodies having rigidly secured thereto a second pair of leaf springs which at their free end portions are rigidly secured to said rigid but light bar member for oscillatorily supporting the latter, and the arrangement of said leaf springs being such that each leaf spring of one pair of springs is arranged in series with the corresponding spring of the other pair.

2. In an elastic suspension device according to claim 1, wherein the said first pair of parallel leaf springs rigidly secured to the said oscillating body and to the said rigid but light bar member is arranged between the parallel leaf springs of the said second pair of leaf springs secured to the said rigid but light bar member and to the said stationary members.

3. In an elastic suspension device according to claim 1, wherein the said two pairs of parallel leaf springs rigidly secured to the said oscillating body and to the said rigid but light bar member, respectively, to the latter and to the said stationary bodies are symmetrically arranged.

4. In an elastic suspension device according to claim 1, wherein the said first pair of parallel leaf springs rigidly secured to the said oscillating body and to the said rigid but light bar member is arranged outside the said second pair of parallel leaf springs secured to the said rigid but light bar member and to the said stationary members.

5. In an elastic suspension device according to claim 1, wherein the said leaf springs are tapered from their ends to their center portions so as to form leaf springs composed each of two opposite triangular portions having a common vertex.

6. Elastic suspension device for an oscillating body, comprising a first pair of double leaf springs; said double leaf springs each comprising two integrally joined half-sections and having their center portions rigidly secured to said oscillating body and their end portions to two rigid but light bar members for oscillatorily suspending said oscillating body, a pair of stationary bodies having rigidly secured thereto the center portions of a second pair of double leaf springs which at their free end portions are rigidly secured to said rigid but light bar members for oscillatorily supporting the latter, and the arrangement of said leaf springs being such that each leaf spring of one pair of springs is arranged in series with the corresponding spring of another pair of leaf springs.

7. In an elastic suspension device according to claim 6, wherein the said half-sections of said double leaf springs are tapered from their ends to their center portions so as to form half-sections each composed of two opposite triangular portions having a common vertex.

8. In an elastic suspension device according to claim 6, wherein the said leaf springs are combined with helical springs connected between the said oscillating body and the said two stationary bodies and acting as energy-storing springs.

9. In an elastic suspension device according to claim 6, wherein stop means are provided in connection with the said bar members for limiting the movements of the latter.

References Cited in the file of this patent

UNITED STATES PATENTS

| | | |
|---|---|---|
| 820,944 | Adams | May 15, 1906 |
| 2,064,489 | Neuman | Dec. 15, 1936 |
| 2,067,803 | Thearle | Jan. 12, 1937 |
| 2,387,223 | Carson | Oct. 16, 1945 |
| 2,526,413 | Rawlins | Oct. 17, 1950 |
| 2,540,832 | Piron | Feb. 6, 1951 |
| 2,615,710 | Lyman | Oct. 28, 1952 |